Oct. 16, 1945. D. P. LOWER 2,386,963
OIL RING
Filed Feb. 27, 1943
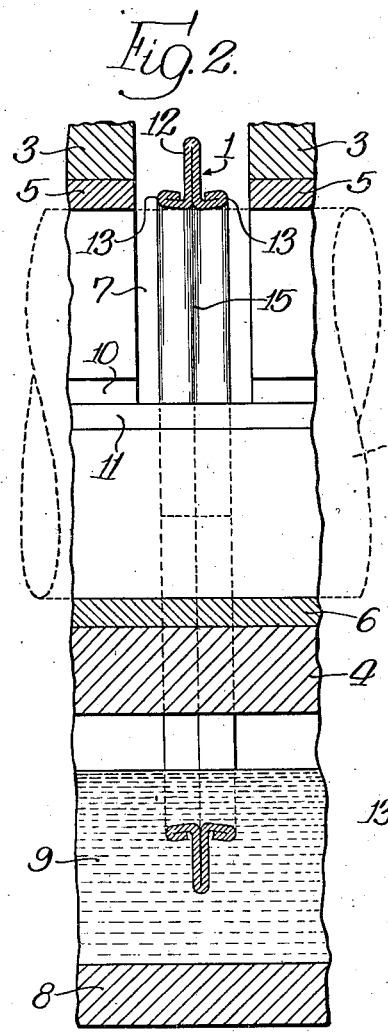
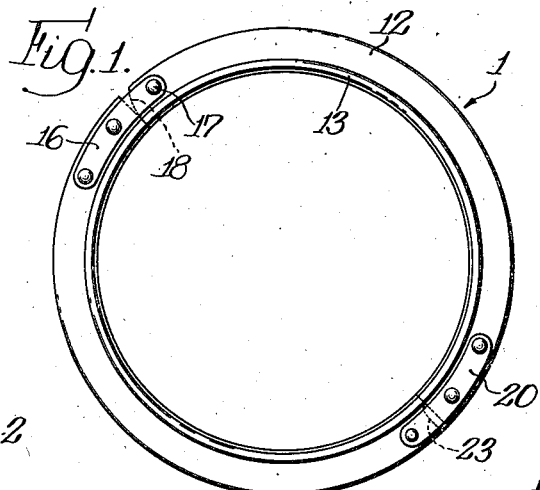
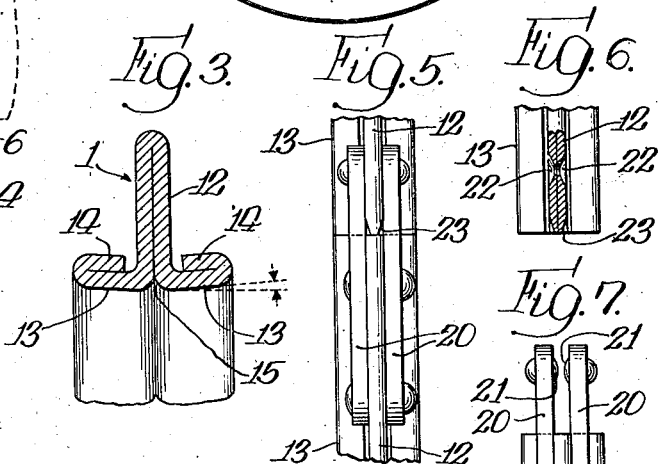
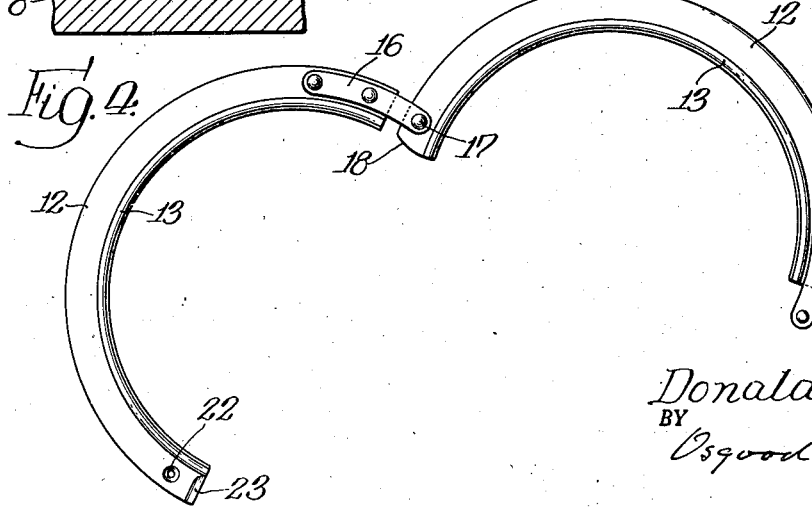
INVENTOR.
Donald P. Lower,
BY
Osgood H. Dowell
Atty.

Patented Oct. 16, 1945

2,386,963

UNITED STATES PATENT OFFICE 2,386,963

OIL RING

Donald P. Lower, Mishawaka, Ind., assignor to Dodge Manufacturing Corporation, Mishawaka, Ind., a corporation of Indiana Application February 27, 1943, Serial No. 477,479

5 Claims. (Cl. 308—129)

This invention relates to improvements in oil rings for use in the lubrication of shaft bearings.

In a shaft bearing of the ring oiler type, lubricating oil is fed to the shaft by one or more metal oil rings accommodated in a passage or passages therefor in the upper half of the bearing and enclosing the shaft and lower half of the bearing, the oil ring or rings hanging from the shaft and dipping in a supply of oil in the lower part of the bearing box and being rotated by the shaft by its frictional engagement therewith.

An oil ring is ordinarily formed in two segments or semicircular sections, these sections being connected rigidly but in such manner as to permit opening of the ring for installing it.

The oil ring of the present invention comprises sections each formed from a single strip of sheet metal and having a novel cross-sectional form giving substantial advantages. An object of the invention is to provide a sheet metal oil ring of very strong and rigid construction, the ring being susceptible of economical manufacture. A further object is to provide such ring in a form conducive to highly efficient performance. These objects are accomplished by means exemplified in the accompanying drawing, wherein:

Fig. 1 is a side elevation of an oil ring embodying the invention.

Fig. 2 is an enlarged vertical section of the oil ring and a portion of the shaft bearing in which it is installed, the section being taken on a vertical plane longitudinally of and through the axis of the bearing, the shaft being indicated by dotted line and only fragmentary portions of the bearing being shown.

Fig. 3 is an enlarged cross section of the oil ring.

Fig. 4 is a side elevation of the oil ring shown in open condition.

Figs. 5, 6 and 7 are detail views of one of the ring joints. Fig. 5 is an elevation thereof looking toward the edge of the ring. Fig. 6 is an elevation partly in section of an end portion of one of the ring segments, and Fig. 7 is an elevation of the adjacent end portion of the other ring segment together with the snap joint means carried thereby.

In the drawing, the reference numeral I designates as a whole an oil ring embodying the invention. As represented in Fig. 2, the oil ring encloses and hangs from a shaft 2 journalled in a horizontally split babbitt-lined bearing mounted in a bearing box which provides in its lower portion an oil reservoir in which the lower part of the ring is submerged. The shaft 2 is indicated in dotted lines, and the bearing structure is only fragmentarily shown. The upper and lower halves of the bearing proper are represented by the parts 3 and 4 respectively lined by the babbitt metal liner parts 5 and 6. The upper half of the bearing proper is divided into the two spaced parts 3 to provide the passage 7 accommodating the oil ring. A portion of the bottom member of the bearing box is shown at 8, and a portion of the supply of oil in which the ring dips is shown at 9. It will be understood that as the shaft rotates it imparts rotative movement to the oil ring, which rests of its own weight on and in contact with the shaft, whereby oil is fed to the shaft for lubricating the bearing. Oil distributing grooves in the bearing surfaces of the upper and lower halves of the bearing are indicated at 10 and 11.

The oil ring 1 comprises rigidly joined segmental sections, each formed from a single strip of sheet metal which is folded and bent along a medial arcuate line and has the portions thereof at opposite sides of the fold line shaped to form oppositely extending reinforced flanges; the cross-sectional shape of the segments somewhat resembling the letter T inverted.

Each ring segment or section comprises an arcuate rib 12 of folded sheet metal perpendicular to the ring axis, the fold line of the metal being at the outer edge of the rib, and arcuate flanges 13 formed as integral extensions of and bent oppositely from the metal layers of the rib. These flanges are formed with rebent portions 14 which reinforce, strengthen and stiffen the flanges and the ring as a whole. In the preferred form, the cross-section of the ring is as shown in Fig. 3, the metal layers of the rib being pressed together and the reinforcing portions 14 of the flanges overlying and pressed against the portions of the flanges which are bent from the metal layers of the rib.

Thus the ring has a tubular inner or shaft-engaging part formed by said flanges and a medial rib extending outwardly therefrom, said rib and the oppositely extending portions of the tubular part being each of two thicknesses of sheet metal joined by bent portions of the metal at the outer edge of the rib and at the ends of the ring.

This construction gives great strength and rigidity in a relatively light ring structure, and makes a ring of practicable and rugged character which can withstand rough handling and severe straining in opening and closing the ring, without injury by bending the ring out of shape or impairing its true circular form.

The ring segments can be economically made by forming by rolling a long sheet metal strip to the cross-sectional form shown, then cutting therefrom sections of appropriate length for the ring segments and bending them to required curvature. The ring segments may also be made from individual blanks by a plurality of stamping operations.

The metal bends joining the flanges 13 to the flat metal layers of the rib form between them an annular oil groove 15 in the middle of the bore of the ring. As a further feature of the invention, the flanges 13 are bent to give resultant angles of less than ninety degrees between said flanges and the metal layers of the rib, so that the inner surfaces of the flanges are somewhat flaring toward the ends of the ring. Preferably the flanges are bent relative to the rib so that, in a plane through and parallel with the axis, the angles between the inner surfaces of the flanges and lines parallel with the axis are about three degrees, as indicated in Fig. 3 by the angle between the dotted lines to which the small arrows are directed. This gives two-point contact between the oil ring and shaft along the annular shoulders flanking the oil groove 15, which is of advantage in promoting highly efficient performance. With such two-point contact, oil is transferred by the ring to the shaft both from the groove or between said shoulders and from the inner surfaces of the ring at either side of and adjacent to the shoulders. The oil ring, which is subject to vibration and propulsive actions by the shaft, can tilt easily on one bearing point or the other without upsetting performance or unduly interfering with the lubricating function. Furthermore, with such two-point contact along annular lines flanking an intermediate oil groove, the ring tends to be maintained steadily in contact with the shaft, which is conducive to constant driving or rotation of the ring. As compared with a prior oil ring of corresponding size and weight, the segments of which were of solid metal and of inverted T-shaped cross section, and the bore of which was crowned to give one-point contact at the middle of the bore, the oil ring embodying the present invention is found to run at a somewhat faster speed, which is advantageous for effective lubrication. Such prior ring with a crowned bore giving one-point contact had been found to give better performance than a straight bored ring giving line contact. So also the oil ring of the present invention is found to give superior performance to that of such prior ring with crowned bore giving one-point contact.

The joints of the illustrative oil ring shown in the drawing are of conventional construction or not novel in themselves, but will be described for explanation of the drawing. The two ring segments are connected at one end by a pair of sheet metal splice bars 16 arranged at opposite sides of and rigidly connected by rivets to the rib of one segment and tightly embracing the rib of the other segment and connected thereto by a single rivet at 17 to provide a hinge connection. One of the segments connected by said splice bars has its end rounded as at 18 to permit swinging the segments to and from the open position shown in Fig. 4. The segments are connected at the other end by a pair of sheet metal splice bars 20 arranged at opposite sides of and rigidly connected by rivets to the rib of one segment and tightly embracing the rib of the other and connected thereto by snap-fastener means provided by protuberances 21 on the inner faces of said splice bars 20 engageable in sockets 22 in the rib of said other segment. Said last mentioned rib has a tapered or wedge-shaped end 23 to forcibly spread the protuberances 21 so that they can snap into place. In the closed condition of the oil ring shown in Fig. 1, the two segments or sections thereof are rigidly connected by the joints shown. To open the ring, the segments must be forcibly pulled in opposite directions, and to close it they must be forcibly pushed together, considerable pull being required to disengage the protuberances 21 from the sockets 22. Sheet metal ring segments of the cross-sectional shape described are so strong and stiff that they can withstand these operations without danger of impairment or bending out of shape. The joint constructions described are desirable in oil rings for shafts of moderate diameters. In the case of oil rings of larger size for shafts of large diameter, it is contemplated that in place of a joint having the snap-fastener feature the adjoining ends of the ring segments will be bolted together by a bolt substituted for the protuberances 21.

I claim:

1. An oil ring comprising segmental sections each formed from a single strip of sheet metal folded along a medial arcuate line and flanged concentrically therewith, each section comprising an arcuate rib of folded sheet metal perpendicular to the ring axis, with the fold line of the metal at the outer edge of the rib, and arcuate flanges bent oppositely from the metal layers of the rib, said flanges being bent to give resultant angles of less than ninety degrees between them and said layers so that the ring has two-point contact with the shaft along annular shoulders flanking the oil groove between the metal bends joining said flanges to said layers.

2. An oil ring comprising segmental sections each formed from a single strip of sheet metal folded along a medial arcuate line and flanged concentrically therewith, each section comprising an arcuate rib of folded sheet metal perpendicular to the ring axis, with the fold line of the metal at the outer edge of the rib, and arcuate flanges bent oppositely from the metal layers of the rib and having circumferentially extending reinforcing and stiffening portions bent from said flanges and arranged outwardly of the bore of the ring, said flanges being bent to give resultant angles of less than ninety degrees between them and said layers, whereby the ring has two-point contact with the shaft along shoulders flanking the oil groove between the metal bends joining said flanges to said layers.

3. An oil ring comprising segmental sections each formed from a single strip of sheet metal folded along a medial arcuate line and flanged concentrically therewith, each section comprising an arcuate rib of folded sheet metal perpendicular to the ring axis, with the fold line of the metal at the outer edge of the rib, and arcuate flanges bent oppositely from the metal layers of the rib and having overlying rebent portions, said flanges being bent to give resultant angles of less than ninety degrees between them and said layers so that the ring has two-point contact with the shaft along shoulders flanking the oil groove between the metal bends joining said flanges to said layers.

4. A sheet metal oil ring having a tubular inner portion and a medial outwardly extending rib, said rib being of folded sheet metal with the fold line at the outer edge of the rib and said tubular portion being formed by flanges bent oppositely from the metal layers of the rib and having overlying rebent portions, said flanges being bent to give resultant angles of less than ninety degrees between them and said layers so that the ring has two-point contact with the shaft along shoulders flanking the oil groove between the metal bends joining said flanges to said layers.

5. An oil ring comprising segmental sections each formed from a single strip of sheet metal folded along a medial arcuate line and flanged concentrically therewith, each section comprising an arcuate rib of folded sheet metal perpendicular to the ring axis, with the fold line of the metal at the outer edge of the rib, the metal layers of the rib being pressed together, and arcuate flanges of doubled sheet metal comprising interfitting layers corresponding ones of which are bent oppositely from the metal layers of the rib and the others of which are bent from and pressed against said ones, the extremities of said others being in near proximity to the layers of the rib, adjacent internal parts of the ring at opposite sides of the medial transverse plane thereof forming an annular oil groove between them, and said flanges being bent to give resultant angles of less than ninety degrees between them and the layers of the rib, whereby the ring has two-point contact with the shaft along shoulders flanking said oil groove.

DONALD P. LOWER.